(12) United States Patent
Matsushiro et al.

(10) Patent No.: US 6,215,287 B1
(45) Date of Patent: Apr. 10, 2001

(54) POWER SUPPLY APPARATUS

(75) Inventors: Hideo Matsushiro; Masanori Ogawa, both of Kusatsu (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/571,893

(22) Filed: May 16, 2000

(30) Foreign Application Priority Data

May 17, 1999 (JP) .................................................. 11-135297

(51) Int. Cl.⁷ ................................. G05F 1/00; G05F 1/40
(52) U.S. Cl. ............................................. 323/222; 323/282
(58) Field of Search .................................... 323/220, 222, 323/282, 284, 285; 363/84, 89, 125, 127

(56) References Cited

U.S. PATENT DOCUMENTS

| | | | |
|---|---|---|---|
| 4,688,162 | * 8/1987 | Mutch et al. | 363/80 |
| 5,793,623 | 8/1998 | Kawashima et al. | |
| 5,798,635 | * 8/1998 | Hwang et al. | 323/222 |
| 5,949,229 | * 9/1999 | Choi et al. | 323/320 |
| 6,034,513 | * 3/2000 | Farrington et al. | 323/222 |

FOREIGN PATENT DOCUMENTS

| | | |
|---|---|---|
| 0695024 | 1/1996 | (EP) . |
| 59-198873 | 11/1984 | (JP) . |
| 8-33392 | 2/1996 | (JP) . |
| 8168255 | 6/1996 | (JP) . |
| 8182329 | 7/1996 | (JP) . |

* cited by examiner

Primary Examiner—Matthew Nguyen
(74) Attorney, Agent, or Firm—Greenblum & Bernstein, P.L.C.

(57) ABSTRACT

The present invention provides a power supply apparatus which can suppress a raising and hunting of output (DC voltage) to a load which is light. The power supply apparatus comprises an AC-to-DC converter for supplying a load with a DC voltage, and a switching operation controller for correcting a power factor and controlling a switching element so that an output or a DC voltage of the AC-to-DC converter becomes a predetermined target value. The switching operation controller has a low-pass filter for smoothening the DC voltage with a variable cut off frequency. By varying the cut-off frequency of the low-pass filter, it is possible to recognize a rising of the DC voltage to suppress and stabilize a boost and hunting of the DC voltage in a light load state.

10 Claims, 12 Drawing Sheets

POWER SUPPLY APPARATUS

CROSS REFERENCE TO RELATED APPLICATION

This application is based on application No. 11-135297 filed in Japan, the contents of which is herein incorporated by reference.

BACKGROUND OF THE INVENTION

1. Field of the Invention

The present invention relates to a power supply apparatus which can supply a regulated (stabilized) DC voltage to electronic apparatuses for industry and livelihood.

2. Description of the Related Art

In recent years, electric and industrial apparatuses have come into wide use, and with this wise use, a high harmonic current is introduced into a power apparatus. This has caused problems such as heating of various apparatuses, malfunction and the like. In order to solve these problems, a suitable measure to the high harmonic is required in various apparatuses. Thus, an AC-to-DC converter has been used as a power supply apparatus built in these apparatuses. The AC-to-DC converter makes use of an energy storage effect by an operation of a reactor and a switching element, and corrects a power factor so as to raise an output voltage.

Japanese Patent Laid-open Publication No. 59-198873 has disclosed a control of the AC-to-DC converter.

As described in the Publication, the control is carried out in the following manner. AC voltage signal is multiplied by a voltage difference between a DC voltage and a target value thereof. Then, a conductive ratio is determined in accordance with the value obtained by the multiply to correct the power factor. FIG. 10 is a circuit diagram showing a construction of the aforesaid conventional power supply apparatus.

An output of an AC power supply 1 is rectified by a rectifier circuit 2 comprising a diode bridge, and then the rectified voltage is switched by a switching element 4 via a reactor 3. Further, voltage across terminals of the switching element 4 is smoothened by a smoothing capacitor 6 via a diode 5 so that a DC voltage is supplied to a load 7. An operation of the switching element 4 is controlled by a switching operation controller 11. The control flow is as follows.

First, a DC voltage value obtained by a DC voltage detecting section 10 is smoothened by a low-pass filter 110. A voltage comparator 112 calculates a voltage difference between the smoothened value and a target value of DC voltage from a target voltage calculating section 111. On the other hand, a target current calculating section 113 calculates a target current by multiplying the voltage difference by a voltage obtained from an input voltage detecting section 9. Next, a current comparator 114 calculates a difference between the target current value calculated by target current calculating section 113 and the current value obtained by the current detecting section 8. Then, in accordance with the difference thus calculated, a conductive ratio of the switching element 4 is determined by a PWM duty calculating section 115. The switching element 4 is switched according to the conductive ratio.

In that AC-to-DC converter, when a load connected to the output terminal becomes large or heavy, as shown in FIG. 11, a ripple having a frequency of two times as much as a voltage 13 of an AC power supply in a DC voltage 14. Therefore, it is general to use a value obtained by passing through a low-pass filter 110 having a slow response speed (with a fixed cut-off frequency of about 1 Hz as shown in FIG. 12) as a DC voltage value to be used for calculating a voltage difference value.

However, in the conventional AC-to-DC converter having the above construction, when a DC voltage raises in a small or light load state in which a load connected to an output terminal is small or light, since a DC voltage passing through a low-pass filter with a slow response speed is used to calculate a voltage difference between the DC voltage and a target value, that is, to determine a conductive ratio of the switching element, there is a problem that the DC voltage continues to raise.

In order to solve this problem, when the DC voltage value raises more than a threshold value which is pre-determined based on a target value, there is a control such that an operation of the switching element is temporarily stopped until the DC voltage value becomes the target value. However, according to such a control, as shown in FIG. 13, there is a problem that a DC voltage 16 is hunting between a target value 18 and a threshold value 19 (In FIG. 13, a waveform 17 shows a rectified voltage value after passing through the low-pass filter.).

SUMMARY OF THE INVENTION

The present invention has been made in order to solve the above problem in the prior art. It is, therefore, an object of the present invention to provide a power supply apparatus which can prevent hunting from being generated in a DC voltage of an AC-to-DC converter even in a low load state.

In order to solve the problem, the present invention provides a power supply apparatus which comprises an AC-to-DC converter, a current detecting section, an input voltage detecting section, a DC voltage detecting section, a switching operation controller and a low-pass filter.

The AC-to-DC converter converts a DC voltage from an AC power supply to supply the DC voltage, and comprises at least a switching element, a reactor and a diode.

The current detecting section detects a current value of the AC power supply. The input voltage detecting section detects a voltage value of the AC power supply. The DC voltage detecting section detects a DC voltage value outputted from the AC-to-DC converter. The switching operation controller corrects a power factor based on each value obtained by the current detecting section, the input voltage detecting section and the DC voltage detecting section. The switching operation controller controls an operation of the switching element so that the DC value becomes a predetermined target value. The low-pass filter for smoothening the DC voltage form the DC voltage detecting section is included in the switching operation controller and has a cut-off frequency which is variable. The cut-off frequency may be varied in accordance with at least one of a detected value by the current detecting section, a detected value by the input voltage detecting section, and a detected value by the DC voltage detecting section, or a load state obtained based on those values.

With the above construction, it is possible to prevent hunting from being generated in a DC voltage of an AC-to-DC converter even in a low load state, and to perform a stable power factor correction and a boost operation even in the case where a load becomes high.

DETAILED DESCRIPTION OF THE PREFERRED EMBODIMENTS

The preferred embodiments of the present invention will be described below with reference to the accompanying drawings.

First Embodiment

Figure 1:
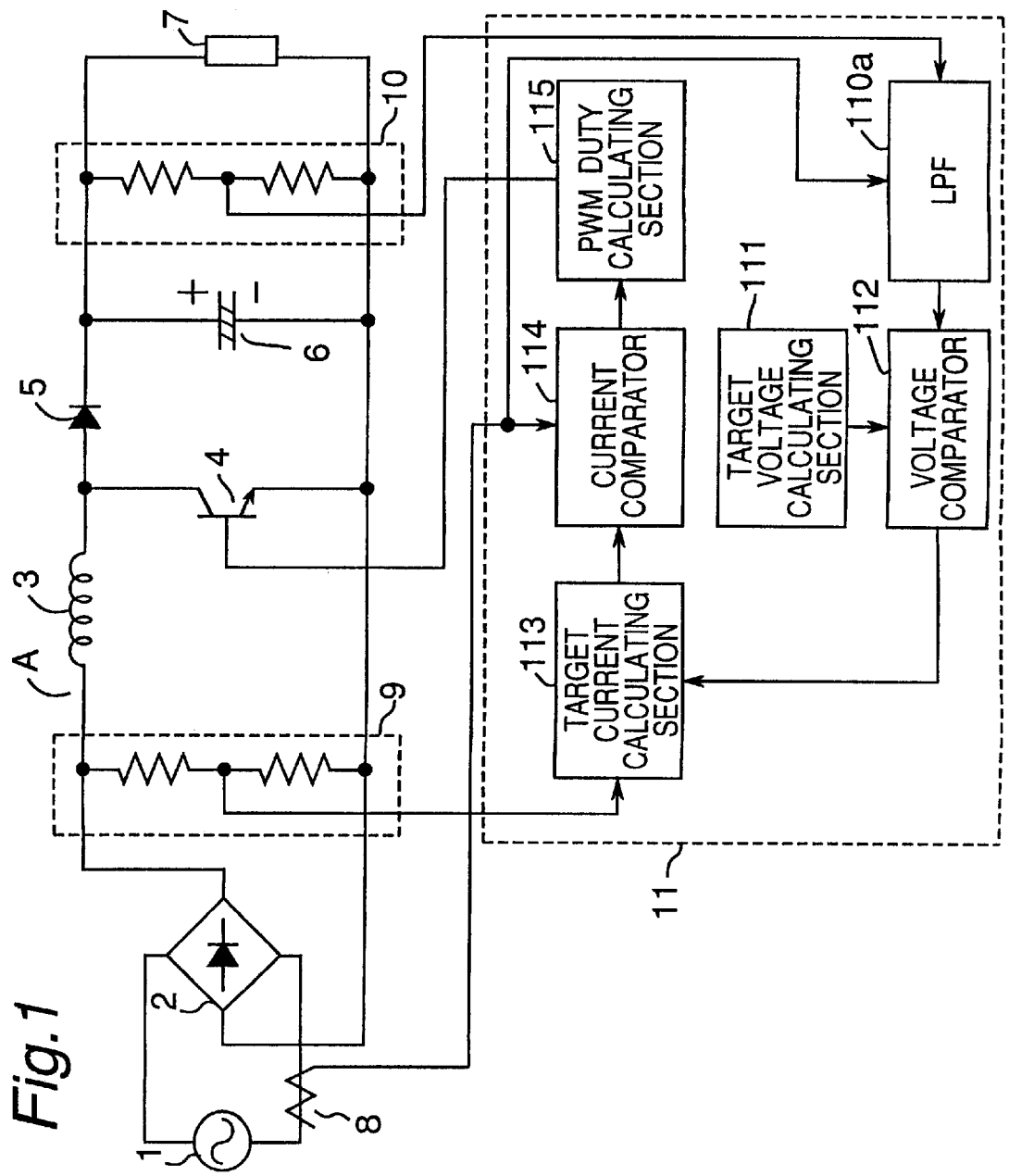
FIG. 1 is a circuit diagram showing a construction of a power supply apparatus according to first, fourth and fifth embodiments of the present invention.
Figure 2:
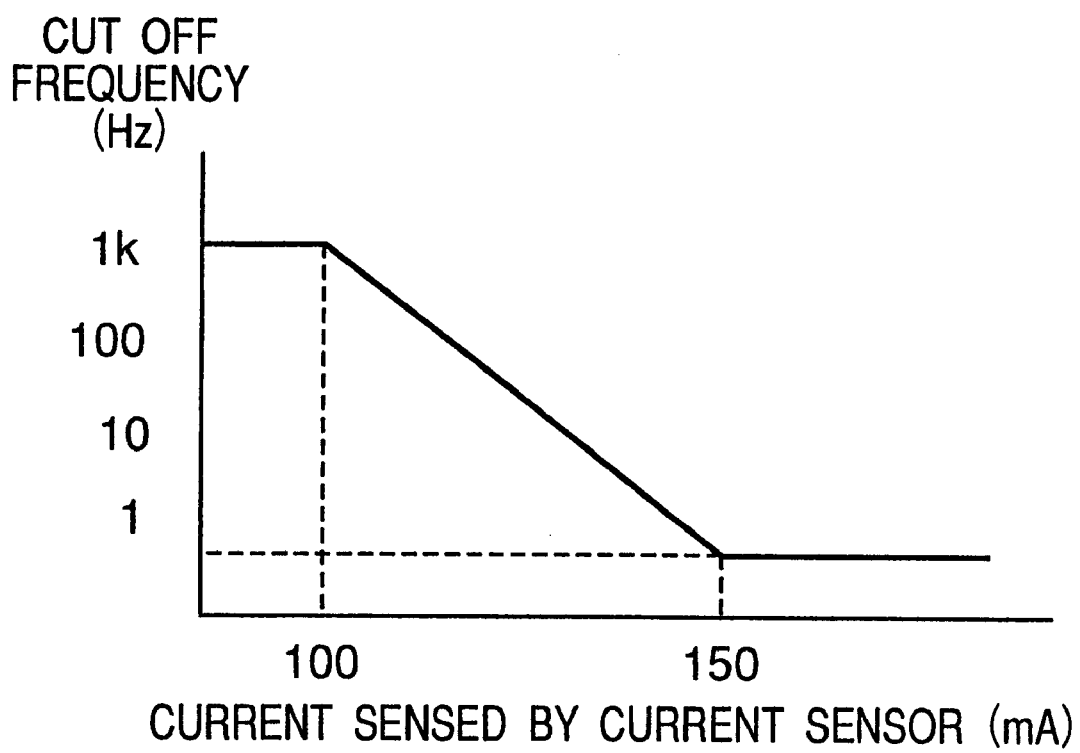
FIG. 2 is a chart showing a characteristic of a cut-off frequency with respect to a current value obtained by a current detecting section in a low-pass filter (LPF) of the first embodiment.
Figure 3:
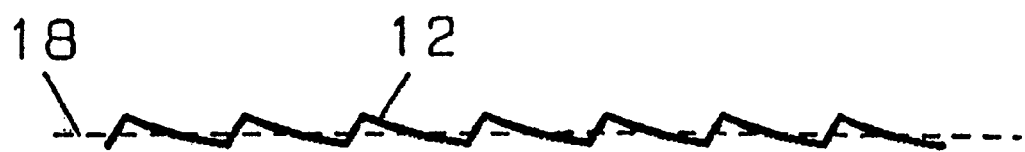
FIG. 3 is a view showing a waveform of an output (DC voltage) of an AC-to-DC converter in a light load state of the first embodiment.

A first embodiment of a power supply apparatus of the present invention will be described below with reference to FIGS. 1, 2 and 3. FIG. 1 is a circuit diagram showing a construction of the power supply apparatus. FIG. 2 is a chart showing a characteristic of a cut-off frequency with respect to a current value obtained by a current detecting section of a low-pass filter. FIG. 3 is a view showing a waveform of an electric signal in a light load state.

An AC-to-DC converter A comprises a rectifier circuit 2 including a diode bridge, a reactor 3, a switching element 4, a diode 5 and a smoothing capacitor 6. The AC-to-DC converter A rectifies an output of an AC power supply 1 by the rectifier circuit 2, switches a voltage obtained from the rectifier circuit 2 by the switching element 4 through the reactor 3, and further smoothens voltage across the switching element 4 by a smoothing capacitor 6 via the diode 5 so as to supply the DC voltage to a load 7. Further, the AC-to-DC converter A is provided with a current detecting section 8 for detecting a value of current of the AC power supply 1, an input voltage detecting section 9 for detecting a value of voltage of the AC power supply 1, and a DC voltage detecting section 10 for detecting a value of DC voltage of the output of the AC-to-DC converter A.

Switching operation of the switching element 4 is controlled by a switching operation controller 11. The controller 11 comprises a low-pass filter (LPF) 110a, a target voltage calculating section 111, a voltage comparator 112, a target current calculating section 113, a current comparator 114 and a PWM duty calculating section 115. The controller 11 operates as follows. First, a DC voltage obtained from the DC voltage detecting section 10 is smoothened by the low-pass filter 110a. A voltage comparator 112 calculates a voltage difference between the smoothened value and a target value of a DC voltage obtained by the target voltage calculating section 111. On the other hand, the target current calculating section 113 calculates a target current value by multiplying the voltage difference by a voltage obtained by the input voltage detecting section 9. Further, the current comparator 114 calculates a difference between the target current calculated by the target current calculating section 113 and the current obtained by the current detecting section 8. In accordance with the difference, the PWM duty calculating section 115a determines conductive ratio of the switching element 4. The switching element 4 is switched based on the conductive ratio.

In particular, in the first embodiment of the present invention, the low-pass filter 110a has a variable cut-off frequency. FIG. 2 shows a characteristic of the cut-off frequency in the low-pass filter 110a. The low-pass filter 110a varies a cut-off frequency depending upon a current obtained by the current detecting section 8. More specifically, when the current detected by the current detecting section 8 is more than 150 mA, the cut-off frequency is set to 1 Hz. When the current is detected to be equal to or less than 100 mA, the cut-off frequency is set to 1 kHz. Further, when the detected current ranges from 100 mA to 150 mA, the cut-off frequency is varied so as to linearly and gradually decrease. The current value obtained by the current detecting section 8 and a magnitude of the load 7 have the proportional relation each other. As a result, as seen from FIG. 2 showing the characteristic of cut-off frequency, the cut-off frequency of the low-pass filter 110a is set low when the load 7 is large, that is, in a heavy load state, while the cut-off frequency is set high when the load 7 is small, that is, in a light load state.

Figure 11:
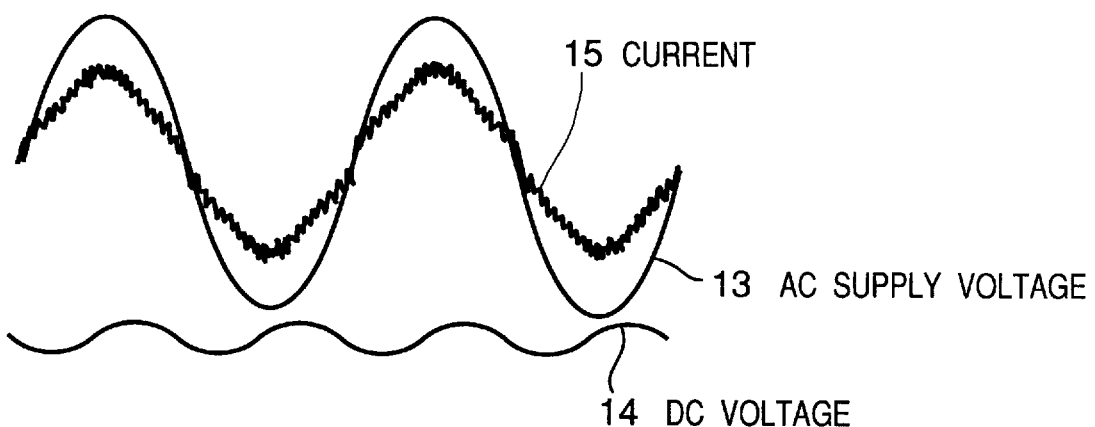
FIG. 11 is a view showing a waveform of an output (DC voltage) of the conventional power supply apparatus.
Figure 12:
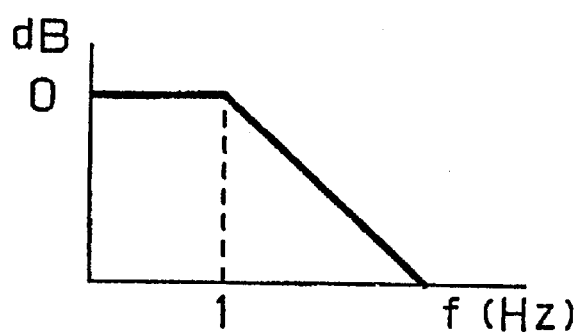
FIG. 12 is a chart showing a filter characteristic of a conventional low-pass filter in which a cut off frequency is fixed.

In the above described construction, from the characteristic of the AC-to-DC converter A, as shown in FIG. 11, a ripple having a frequency of two times as much as a voltage 13 of the AC power supply 1 is generated on a DC voltage 14. This ripple component is 100 Hz or 120 Hz in the case of using a commercial power supply, and the cut-off frequency of the low-pass filter 110a is set to 1 Hz when the current is more than 150 mA. Therefore the ripple component can be eliminated.

Meanwhile, when it is detected that the load 7 is light and the current is equal to or less than 100 mA, the cut-off frequency of the low-pass filter 110a is set to 1 kHz. However, almost no ripple appears in the light load state. Therefore, there is no problem even if the cut-off frequency is set to 1 kHz.

Figure 13:
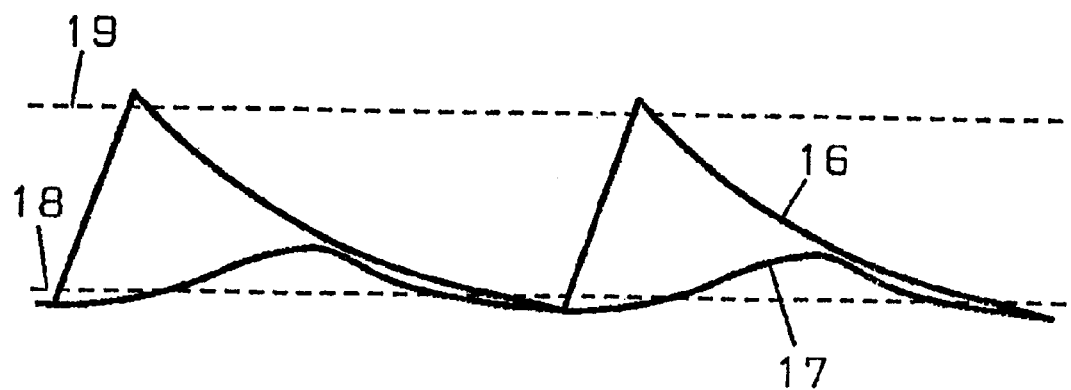
FIG. 13 is a view showing a waveform of an output (DC voltage) in a light load state of the conventional power supply apparatus.

According to the prior art, in the light load state, when a DC voltage rises up to a target value or more by a boost operation of the AC-to-DC converter A, as shown in FIG. 13, there is a problem that the boost operation is continued since the rising of the DC voltage 16 can not be recognized when the cut-off frequency of the low-pass filter 110a is low.

In this first embodiment, the low-pass filter 110a has a cut-off frequency set to 1 kHz, and thereby, even if the DC voltage 12 rises up as shown in FIG. 3, it is possible to instantaneously recognize a voltage rising, and to finally reduce a conductive ratio of the switching element 4 by the control flow of the switching operation control section 11 to suppress the voltage rising.

The low-pass filter 110a varies the cut-off frequency not stepwise but linearly to gradually decrease when the current ranges from 100 mA to 150 mA. Therefore, it is possible to keep a stabilization of the operation of the AC-to-DC converter A.

As described above, according to this first embodiment of the present invention, in the light load state, the DC voltage value does not rise up to a target value or more by a boost operation of the AC-to-DC converter. For example, in the case where the power supply apparatus of this first embodiment is applied to an outdoor unit of a separate type air conditioner, a compressor of the outdoor unit could be started up under a stable DC voltage.

Preferably, the setting value shown in the characteristic chart of FIG. 2 may be tuned according to a characteristic of components used in the AC-to-DC converter A, the characteristic of the entire system, or the like.

According to this first embodiment, there is no case where the DC voltage rises up to a target value or more by a voltage rising operation of the AC-to-DC converter A. Therefore, the DC voltage can be kept under a stable value, and a usual power factor correction can consist with a voltage raising operation.

Second Embodiment

Figure 4:
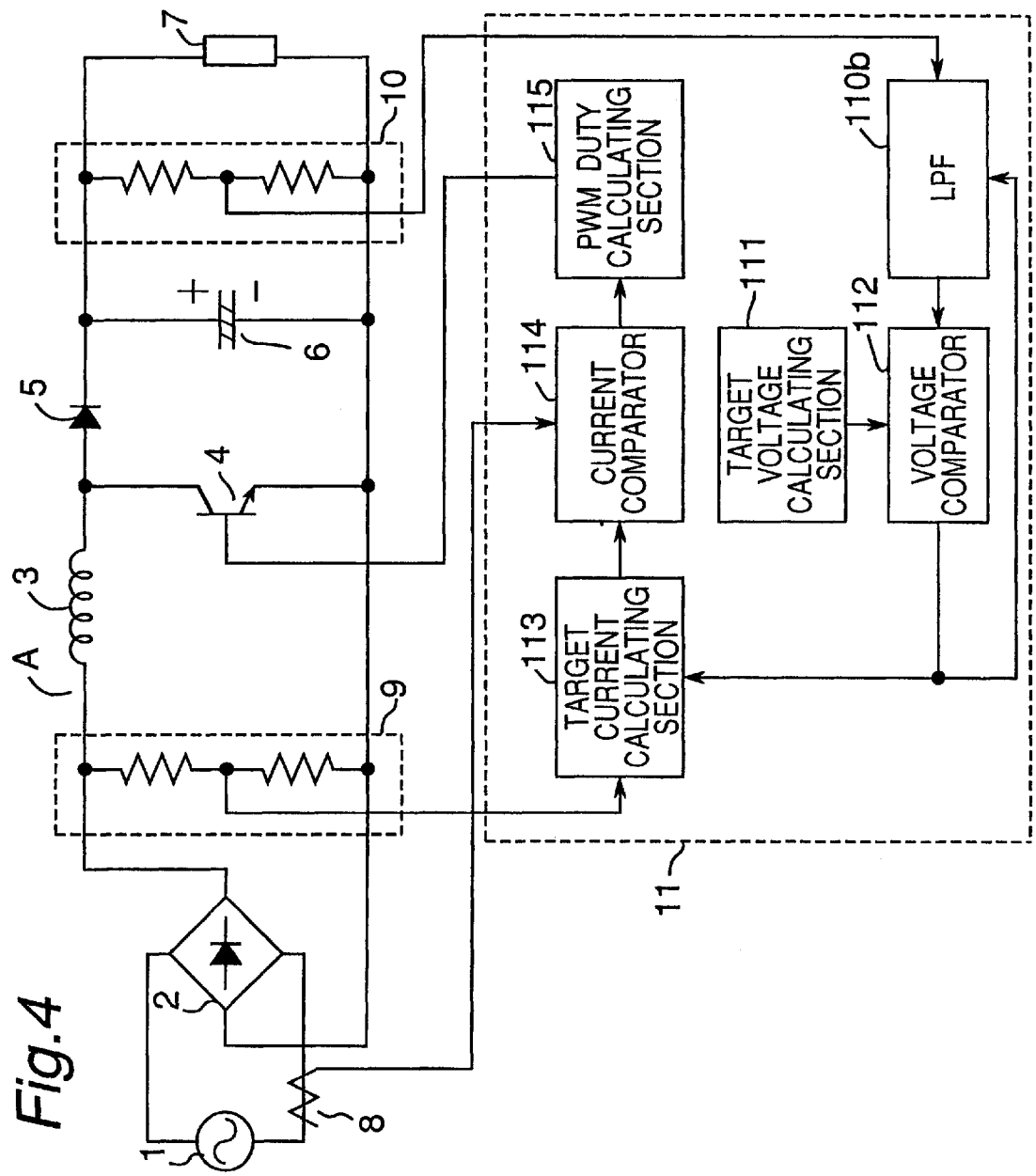
FIG. 4 is a circuit diagram showing a construction of a power supply apparatus according to a second embodiment of the present invention.

FIG. 4 is a circuit diagram showing a construction of a power supply apparatus according to a second embodiment of the present invention. This second embodiment is different from the above first embodiment in a construction of the low-pass filter. In this case, like reference numerals are used to designate portions having the same construction and effect as the first embodiment. Only the different portion will be described below.

Figure 5:
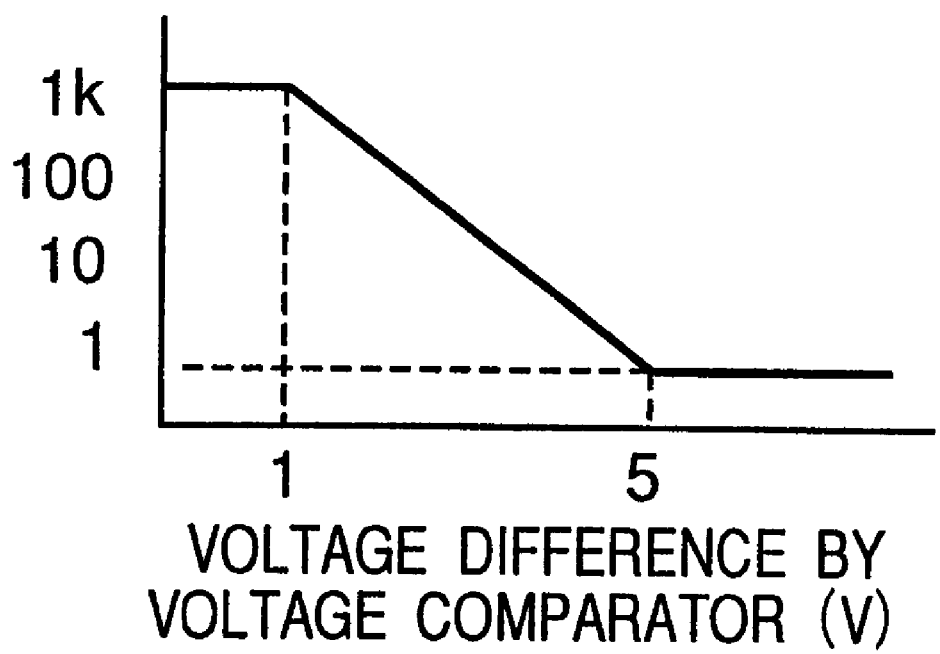
FIG. 5 a chart showing a characteristic of cut-off frequency with respect to a voltage difference value obtained by a voltage comparator in a low-pass filter of the second embodiment.

A low-pass filter 110b varies a cut-off frequency based on a voltage difference obtained by the voltage comparator 112. FIG. 5 is a chart showing a characteristic of the cut-off frequency with respect to the voltage difference value. The cut-off frequency is set to 1 Hz when the voltage difference value calculated by the voltage comparator 112 is equal to or more than 5 V, while the cut-off frequency is set to 1 kHz when the voltage difference value calculated by the voltage comparator 112 is equal to or less than 1V. Further, when the voltage difference value ranges from 1V to 5V, the cut-off frequency is varied so as to linearly and gradually decrease.

In the AC-to-DC converter A of this second embodiment, a DC voltage detected by the DC voltage detecting section 10 is controlled to approach a target value of DC voltage obtained by the target voltage calculating section 111. In fact, the DC voltage has a characteristic of gradually decreasing from the target value as the load 7 becomes large. Namely, there exist a proportional relation between the voltage difference between the DC voltage detected by the DC voltage detecting section 10 and the target value of DC voltage obtained by the target voltage calculating section 111, and a magnitude of the load 7.

Thus, the low-pass filter 110b having the characteristic as shown in FIG. 5 varies the cut-off frequency so that the frequency linearly and gradually decreases, and thereby, like in the first embodiment, the DC voltage value does not rises up to a target value or more in a boost operation of the AC-to-DC converter A. Therefore, it is possible to keep the DC voltage value under a stable value and to perform both a usual power factor correction and a boost operation.

Third Embodiment

Figure 6:
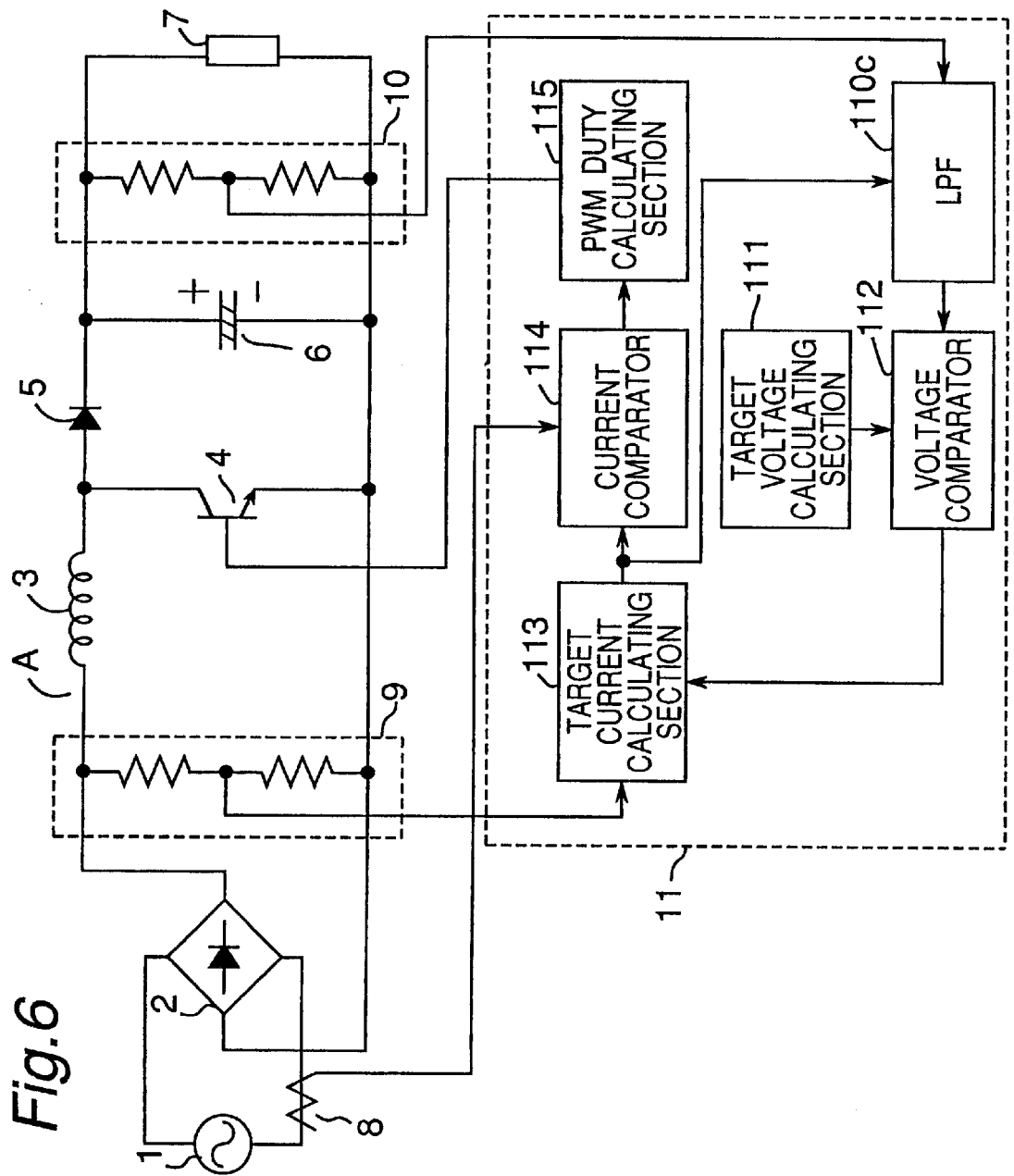
FIG. 6 is a circuit diagram showing a construction of a power supply apparatus according to a third embodiment of the present invention.

FIG. 6 is a circuit diagram showing a construction of a power supply apparatus according to a third embodiment of the present invention. This third embodiment is different from the first embodiment in a construction of the low-pass filter. In this case, like reference numerals are used to designate portions having the same construction and effect as the first embodiment. Only the different portion will be described below.

Figure 7:
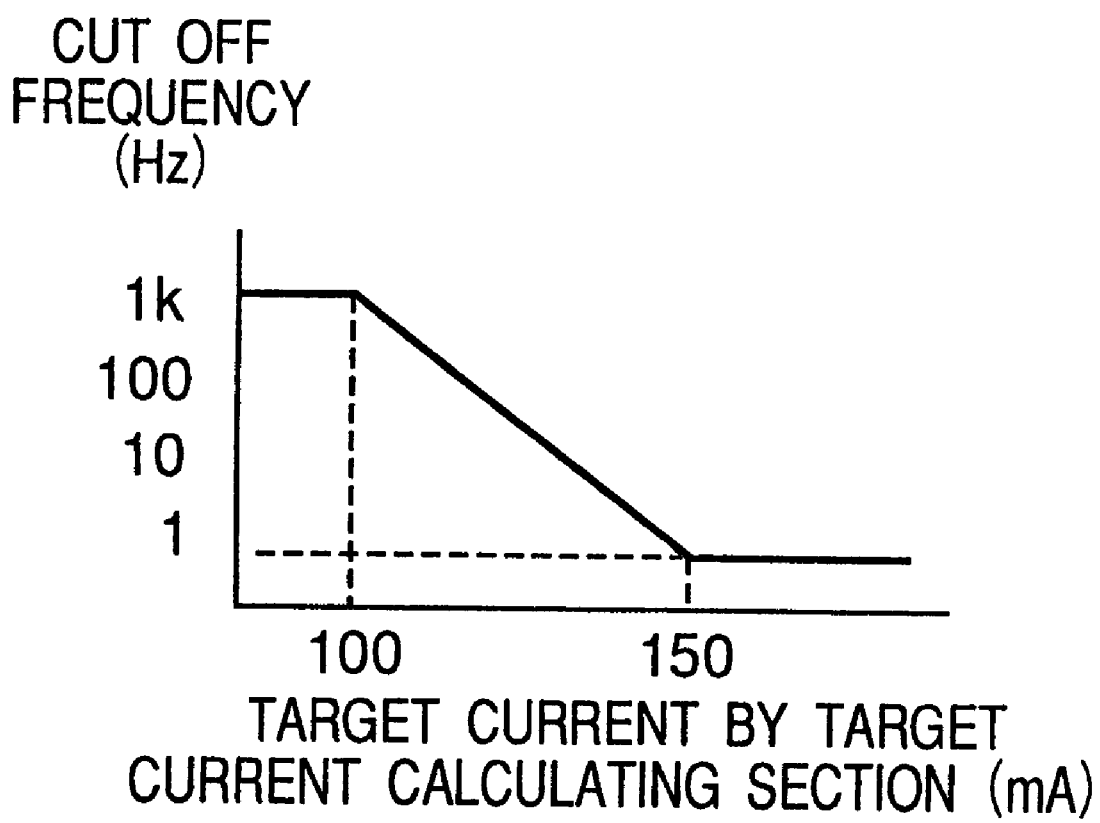
FIG. 7 a chart showing a characteristic of cut-off frequency with respect to a desired current value obtained by a target current calculating section in a low-pass filter of the third embodiment.

A low-pass filter 110c varies a cut-off frequency based on a target current value obtained by the target current calculating section 113. FIG. 7 shows a characteristic of the cut-off frequency with respect to the target current value. The cut-off frequency is set to 1 Hz when a current value calculated by the target current calculating section 113 is equal to or more than 150 mA, while the cut-off frequency is set to 1 kHz when the current value is equal to or less than 100 mA. Further, when the current value ranges from 100 mA to 150 mA, the cut-off frequency is varied so as to linearly and gradually decrease. In the AC-to-DC converter A, the target current value obtained by the target current calculating section 113 and a magnitude of the load 7 have the proportional relation. As a result, as seen from FIG. 7 showing the characteristic of cut-off frequency, when the load 7 is large, that is, in a heavy load state, the cut-off frequency of the low-pass filter 110c is set low. On the other hand, when the load 7 is small, that is, in a low load state, the cut-off frequency is set high.

In the above construction, as seen from the characteristic chart as shown in FIG. 7, the cut-off frequency is varied so as to linearly and gradually decrease, and thereby, like the above first embodiment, the DC voltage value does not rise up to a target value or more by a boost operation of the AC-to-DC converter A. Therefore, it is possible to keep the DC voltage value under a stable value, and to perform both a usual power factor correction and a boost operation.

In the above first to third embodiments, a load state is recognized by using values obtained by the current detecting section 8, the input voltage detecting section 9 and the DC voltage detecting section 10, or a value calculated on the based of the obtained value. The same effect however can be obtained, even if each cut-off frequency of the low-pass filters 110a, 110b and 110c may be modified depending upon a value of control command to a inverter when the inverter is a load, or a rotational speed when the load is a motor.

Fourth Embodiment

Figure 8:
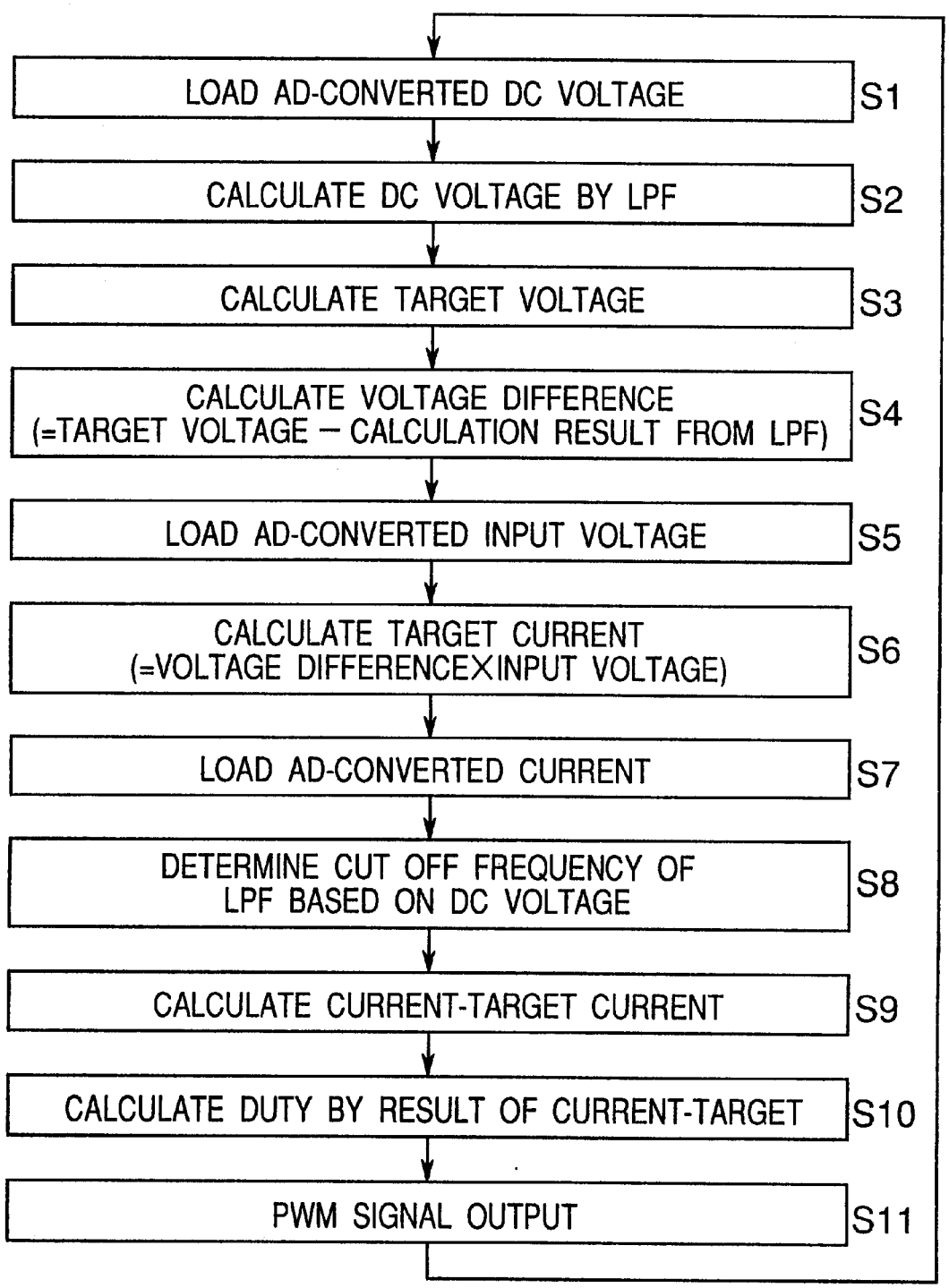
FIG. 8 is a program flowchart of the fourth and fifth embodiments.

According to this fourth embodiment, the switching operation controller 11 of the first to third embodiments of the present invention is composed of a microcomputer. FIG. 8 is a flowchart showing an operation of a switching operation controller 11 of the first embodiment.

First, in step S1, the DC voltage detecting section 10 inputs a DC voltage of the AC-to-DC converter A. In step S2, a low-pass filter calculation is carried out with respect to the inputted DC voltage value. More specifically, the inputted DC voltage is smoothened by the low-pass filter 110a having a cut-off frequency characteristic with respect to the detection value of the current detecting section 8 as shown in FIG. 2 in order to a smoothened DC voltage. In step S3, the target voltage calculating section 111 calculates a target voltage value. In step S4, the voltage comparator 112 calculates a voltage difference between the DC voltage value and a target value of the DC voltage obtained by the target voltage calculating section 111. In step S5, an input voltage is obtained by the input voltage detecting section 9, and in step S6, the target current calculating section 113 calculates a target current value by multiplying the voltage difference by an input voltage detected by the input voltage detecting section 9. Subsequently, in step S7, the current detecting section 8 obtains a current. In step S8, a cut-off frequency of the low-pass filter 110a is determined by a value of the current. Further, in step S9, the current comparator 114 calculates a difference between the target current calculated by the target current calculating section 113 and the current obtained by the current detecting section 8. In step S10, in accordance with the difference thus calculated, a conductive ratio of the switching element 4 is determined by the PWM duty calculating section 115. In step S11, the PWM duty calculating section 115 outputs a PWM signal including the conductive ratio to the switching element 4.

As described above, after an A/D conversion of the current obtained by the current detecting section 8, the cut-off frequency of the low-pass filter 110a is determined. The program is subjected to routine processing, and then, the above cut-off frequency is used in the next calculation of the low-pass filter 110a.

Although this fourth embodiment is described based on the procedure on the first embodiment, this fourth embodiment can be described based on the same procedure in the second or third embodiment.

Figure 9:
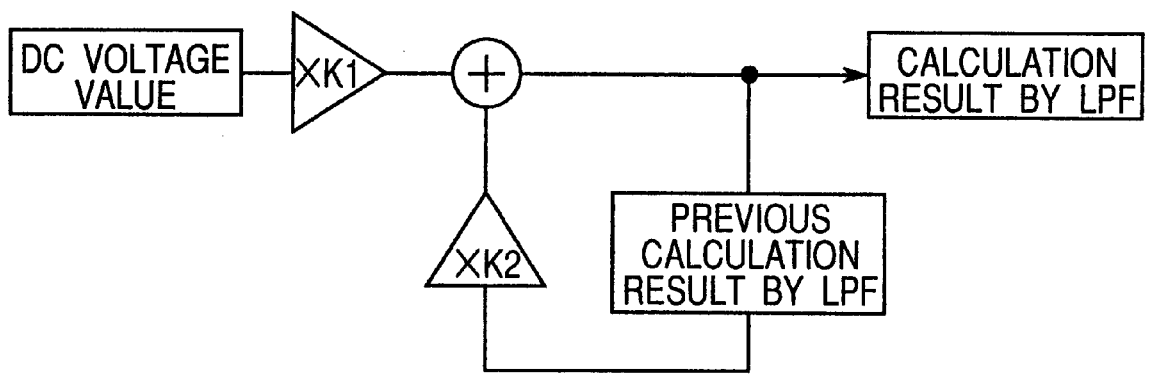
FIG. 9 is a signal flowchart of a DC voltage value low-pass filter calculation of the fourth and fifth embodiments.
Figure 10:
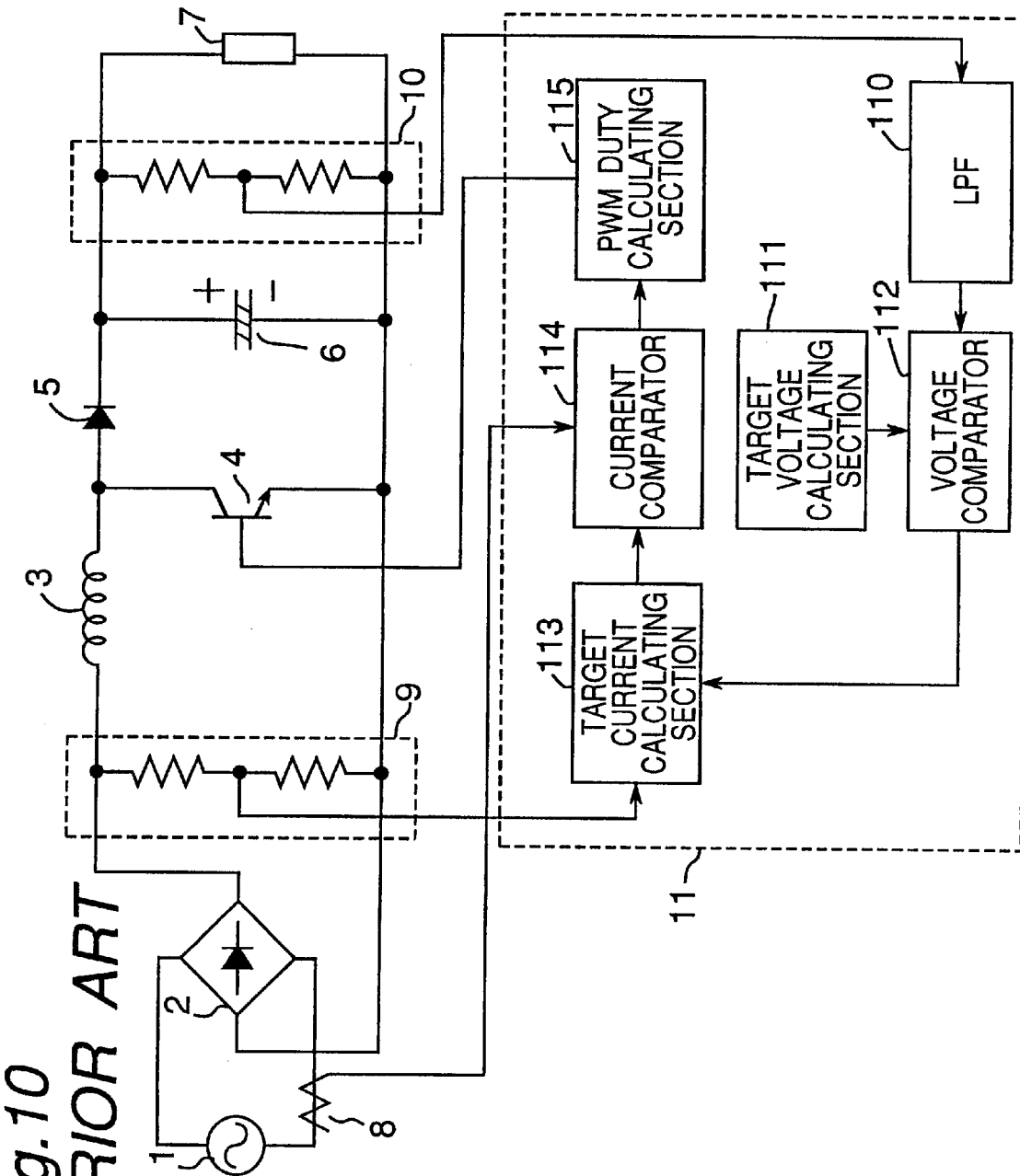
FIG. 10 is a circuit diagram showing a construction of a conventional power supply apparatus.

FIG. 9 shows a signal flow of calculation of a DC voltage by the low-pass filter. The value of DC voltage obtained by the DC voltage detecting section 10 is multiplied by a coefficient K1. Then, the multiply result is added to the previous calculation result of the low-pass filter 110a which is multiplied by a coefficient K2. The result thus obtained becomes a calculation result of the low-pass filter 110a. The coefficients K1 and K2 have the relation of K1+K2=1, and a cut-off frequency is determined by the coefficient value.

In this fourth embodiment, a series of calculating procedure including a variable control of cut-off frequency by modifying the coefficients K1 and K2 is carried out by a program stored in the microcomputer. Therefore, as compared with the case where the power supply apparatus is constructed in combination with electronic circuits, it is possible to extremely readily and stably keep a DC voltage value.

Fifth Embodiment

According to this fifth embodiment of the present invention, the control by the switching operation controller 11 in the first to third embodiments is carried out by a DSP (Digital Signal Processor). A program flow of the DSP is same as shown in FIG. 8 described in the above fourth embodiment. The DSP is a processor which is capable of carrying out a filter calculation at a high speed, and has a capability of processing sum and product operation in one machine cycle.

The control of the program flow in this fifth embodiment is the same as the fourth embodiment. It is possible to realize a series of calculation including a variable control of cut-off frequency by a very simple program.

Although the present invention has been described in connection with specified embodiments thereof, many other modifications, corrections and applications are apparent to those skilled in the art. Therefore, the present invention is not limited by the disclosure provided herein but limited only to the scope of the appended claims.

What is claimed is:

1. A power supply apparatus comprising:
   an AC-to-DC converter for supplying a DC voltage converted from output of an AC power supply, the AC-to-DC converter including at least a switching element, a reactor and a diode;
   a current detecting section for detecting a value of current of the AC power supply;
   an input voltage detecting section for detecting a value of voltage of the AC power supply;
   a DC voltage detecting section for detecting a value of DC voltage supplied from the AC-to-DC converter;
   a switching operation controller for correcting a power factor based on each value obtained by the current detecting section, the input voltage detecting section and the DC voltage detecting section, and for controlling an operation of the switching element to control the DC voltage to a target voltage; and
   a low-pass filter for smoothening the DC voltage from the DC voltage detecting section, which is included in the switching operation controller and has a variable cut-off frequency.

2. The apparatus according to claim 1, wherein the low-pass filter varies the cut-off frequency in accordance with a value of current detected by the current detecting section.

3. The apparatus according to claim 1, wherein the switching operation controller comprises a voltage comparator for calculating a voltage difference between a DC voltage smoothed by the low-pass filter and the target voltage, and the low-pass filter varies the cut-off frequency in accordance with the voltage difference obtained by the voltage comparator.

4. The apparatus according to claim 1, wherein the switching operation controller comprises a voltage comparator for calculating voltage difference between a DC voltage smoothed by the low-pass filter and the target voltage, and a target current calculating section for calculating a target current by multiplying the voltage difference from the voltage comparator by a voltage from the input voltage detecting section, and wherein the low-pass filter varies the cut-off frequency in accordance with the target current from the target current calculating section.

5. The apparatus according to claim 1, wherein the switching operation controller comprises a microcomputer.

6. The apparatus according to claim 1, wherein the switching operation controller comprises a Digital Signal Processor.

7. A power supply apparatus comprising:
   an AC-to-DC converter that supplies a DC voltage converted from an output of an AC power supply, the AC-to-DC converter including at least a switching element, a reactor and a diode;
   a current detecting section that detects a value of current of the AC power supply;
   an input voltage detecting section that detects a value of voltage of the AC power supply;
   a DC voltage detecting section that detects a value of DC voltage supplied from the AC-to-DC converter;
   a switching operation controller that corrects a power factor based on each value obtained by the current detecting section, the input voltage detecting section and the DC voltage detecting section, and that controls an operation of the switching element to control the DC voltage to a target voltage; and
   a low-pass filter for smoothening the DC voltage from the DC voltage detecting section, which is included in the switching operation controller, the low-pass filter having a cut-off frequency which is responsive to a predetermined input signal.

8. The power supply apparatus according to claim 7 wherein the predetermined input signal is based upon current detected by the current detecting section.

9. The power supply apparatus according to claim 7 wherein the predetermined input signal is based upon a voltage difference between a DC voltage smoothed by the low-pass filter and the target voltage.

10. The power supply apparatus according to claim 7 wherein the predetermined input signal is based upon target current obtained by multiplying a voltage difference between a DC voltage smoothed by the low-pass filter and the target voltage by a voltage from the input voltage detecting section.

* * * * *

UNITED STATES PATENT AND TRADEMARK OFFICE
CERTIFICATE OF CORRECTION

PATENT NO. : 6,215,287 B1
DATED : April 10, 2001
INVENTOR(S) : H. Matsushiro et al.

It is certified that error appears in the above-identified patent and that said Letters Patent is hereby corrected as shown below:

Title page,
Item [56], References Cited, the following Other Documents were omitted and should be included:
-- An English Language Abstract of JP 59-198873
   An English Language Abstract of JP 8-168255
   An English Language Abstract of JP 8-33392
   An English Language Abstract of JP 8-182329 --

Signed and Sealed this

Eighteenth Day of December, 2001

Attest:

JAMES E. ROGAN
Attesting Officer     Director of the United States Patent and Trademark Office